United States Patent
Imai et al.

(10) Patent No.: US 6,208,596 B1
(45) Date of Patent: Mar. 27, 2001

(54) OPTICAL PICKUP AND OPTICAL DISK UNIT

(75) Inventors: Satoshi Imai, Tokyo; Yoshito Asoma, Saitama, both of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/220,573

(22) Filed: Dec. 23, 1998

(30) Foreign Application Priority Data

Dec. 25, 1997 (JP) .................................................. 9-357372

(51) Int. Cl.[7] .................................................. G11B 7/095
(52) U.S. Cl. ........................................ 369/44.23; 369/109
(58) Field of Search ................................ 369/44.23, 109

(56) References Cited

U.S. PATENT DOCUMENTS

| | | | |
|---|---|---|---|
| 5,793,725 | * | 8/1998 | Tezuka et al. ..................... 369/44.23 |
| 5,956,302 | * | 9/1999 | Maeda et al. ...................... 369/44.23 |
| 5,986,996 | * | 8/1998 | Kitamura et al. .................. 369/44.23 |

* cited by examiner

Primary Examiner—Aristotelis M. Psitos
(74) Attorney, Agent, or Firm—Ronald P. Kananen; Rader, Fishman & Grauer

(57) ABSTRACT

An optical pickup and an optical disk unit based on the optical pickup, which are capable of reducing their sizes, and of providing a low-cost construction, and further, of allowing accurate servo. The optical pickup comprises an optical separating section which is, in its optical source side surface, equipped with a first diffraction grating and an optical path branching section composed of a plurality of surfaces having normal vectors different from each other, and which is, in its optical disk side surface, equipped with a second diffraction grating composed of a continuous area. The first diffraction grating divides light from a light source into main and side beams, while the second diffraction grating allows the light from the light source to pass and diffracts the returning light from an optical disk toward the optical path branching section. The optical path branching section divides the returning light from the optical disk to lead the divisions to light-receiving sections of an optical detector.

14 Claims, 4 Drawing Sheets

OPTICAL PICKUP AND OPTICAL DISK UNIT

BACKGROUND OF THE INVENTION

1. Field of the Invention

The present invention relates to an optical pickup for recording and/or reproducing a signal on and/or from an optical disk such as a minidisk (MD), a magneto optical disk (MO), a compact disk (CD) and a CD-ROM, and further to an optical disk unit equipped with this optical pick up.

2. Description of the Related Art

So far, as an optical pickup for an optical disk, various types using a hologram device have been proposed for the purpose of simplifying, stabilizing and size-reducing an optical system, for example, constructed as shown in FIG. 3.

In FIG. 3, an optical pickup, generally designated at numeral 1, is made up of a light-emitting device 2, a hologram device 3, an objective lens 4 and an optical detector 5.

The hologram device 3 has two surfaces perpendicular to the optical axis of a light beam from the light-emitting device 2, with a diffraction grating 3a being formed in the first surface (lower surface in FIG. 3) existing on the light-emitting device 2 side and on the optical axis of the light beam from the light-emitting element 2.

In addition, the hologram device 3 has a hologram 3b formed in its second surface (upper surface in FIG. 3) existing on an optical disk D side and on the optical axis of the light beam from the light-emitting device 2.

The hologram 3b allows the light beam from the light-emitting device 2 to directly pass, and makes the light returning from the optical disk D to diffract to be led into the aforesaid optical detector 5.

In this instance, the hologram 3b is, as illustrated, composed of two hologram sections 3b-1, 3b-2 made by division along a direction parallel to a track direction of the optical disk D, and the hologram sections 3b-1, 3b-2 have discontinuous spatial frequencies with respect to each other.

In the case of being illustrated, the optical detector 5 comprises a central light-receiving section 5a for receiving a main beam after the division by the diffraction grating 3a and light-receiving portions E, F provided on both sides of the light-receiving section 5a to receive side beams, and further, the light-receiving section 5a is composed of four light-receiving portions A, B, C and D established by vertically and horizontally dividing the light-receiving section 5a into four.

Furthermore, in a non-shown processing circuit, detection signals from the aforesaid light-receiving portions A, B, C, D, E and F are amplified by a head amplifier into output signals Sa, Sb, Sc, Sd, Se and Sf.

In addition, in an arithmetic circuit, for instance, a reproduction signal RF1 is calculated according to the following equation (1).

$$RF1 = (Sa+Sb)+(Sc+Sd) \quad (1)$$

Further, a focus error signal FE1 is given according to the following equation (2) or (3).

$$FE1 = (Sa-Sb) \quad (2)$$

$$FE1 = (Sa+Sd)-(Sc+Sb) \quad (3)$$

Still further, a tracking error signal TE1 is given by the following equation (4).

$$TE1 = (Se-Sf) \quad (4)$$

In the optical pickup 1 thus constructed, a light beam from the light-emitting device 2 is divided through the diffraction grating 3a of the hologram device 3 into a main beam and two side beams, and subsequently, passes through the hologram 3b to reach a signal recorded surface of the optical disk D by means of the objective lens 4.

A returning optical beam reflected on this signal recorded surface again passes through the objective lens 4 to be incident on the hologram 3b, where this returning light is diffracted by each of the hologram portions 3b-1, 3b-2 of the hologram 3b so that the returning light due to the main beam is incident on the light-receiving section 5a of the optical detector 5 while the returning light resulting from the side beams are incident on the light-receiving portions E, F of the optical detector 5.

Whereupon, on the basis of the detection signals from the respective light-receiving portions A, B, C, D, E and F of the optical detector 5, the detection of the reproduction signal RF1, the focus error signal FE1 and tracking error signal TE1 are possible.

In addition, there has also been known an optical pickup shown in FIG. 4.

In FIG. 4, an optical pickup, generally designated at numeral 6, includes a light-emitting/receiving device 7, a hologram device 3 and an objective lens 4.

The light-emitting/receiving device 7 is, as illustrated, constructed integrally on one semiconductor substrate 7a.

More specifically, in the light-emitting/receiving device 7, a light-emitting section is made up of a semiconductor laser element 7b formed on a semiconductor substrate 7a and a reflecting mirror 7c formed to be inclined obliquely from a surface of the semiconductor substrate 7a. In addition, an optical detector is composed of first and second optical detectors 8, 9 placed on the semiconductor substrate 7a.

In this case, the aforesaid hologram device 3 has two surfaces perpendicular to the optical axis of a light beam from the light-emitting/receiving device 7, and a diffraction grating 3a is formed in the first surface (lower surface in FIG. 4) existing on the light-emitting/receiving device 7 side and on the optical axis of the light beam from light-emitting/receiving device 7 while a hologram 3c is formed in the second surface (upper surface in FIG. 4) existing on an optical disk D side and on the optical axis of the light beam from light-emitting/receiving device 7.

In this instance, the aforesaid hologram 3c is constructed as being one continuous area, and allows the light beam from the light-emitting/receiving device 7 to directly pass and diffracts the returning light from the optical disk D so that 1 order light and -1 order light are led into the first and second optical detectors 8, 9, respectively.

As illustrated, each of the optical detectors 8, 9 comprises a central light-receiving section on which a main beam divided by the diffraction grating 3a is incident and light-receiving sections 8e, 8f or 9e, 9f located on both sides of this central light-receiving section for receiving side beams, with the central section having light-receiving portions 8a, 8b and 8c or 9a, 9b and 9c established by dividing the central section into three along division lines parallel to the track direction of the optical disk D.

Furthermore, in a non-shown processing circuit, the detection signals from the light-receiving portions 8a, 8b, 8c, 8e and 8f or 9a, 9b, 9c, 9e and 9f are amplified by a head amplifier into output signals SA, SB, SC, SE, SF, SG, SH, SI, SK and SL. In addition, for example, a reproduction signal RF2 is given according to the following equation (5).

$$RF2=(SA+SB+SC)+(SG+SH+SI) \quad (5)$$

Further, a focus error signal FE2 is given by the following equation (6).

$$FE2=(SA+SH+SC)-(SG+SB+SI) \quad (6)$$

Still further, a tracking error signal TE2 is given by the following equation.

$$TE2=(SE+SK)-(SF+SL) \quad (7)$$

In the optical pickup 6 thus constructed, a light beam from the light-emitting/receiving device 7 is divided into a main beam and two side beams, and subsequently, passes through the hologram 3c to reach a signal recorded surface of the optical disk D through the objective lens 4.

The returning light beam from this signal recorded surface is incident on the hologram 3c after again passing through the objective lens 4. In this instance, the returning light is diffracted by the hologram 3c so that 1 order light and −1 order light are incident on the first and second optical detectors 8, 9, respectively.

Whereupon, on the basis of the detection signals of the light-receiving portions of the optical detectors 8, 9, the detection of the reproduction signal RF2, the focus error signal FE2 and the tracking error signal TE2 are possible.

However, the optical pickups 1, 6 constructed as described above produce the following problems.

First, in the case of the optical pickup 1, although the focus error signal is made to be detected according to the so-called Foucault's method, in order to lead the returning light due to the main beam into each of the detecting portions A, B, C and D of the optical detector 5, there is a need for the hologram 3b of the hologram device 3 to be constructed to include a plurality of areas 3b-1, 3b-2 having different diffraction angles.

Accordingly, a mask metal pattern or the like for manufacturing the hologram device 3 through the use of the etching, injection molding or the like becomes complicated, which raises the manufacturing cost.

On the other hand, in the case of the optical pickup 6, the focus error signal is designed to be detected according to the so-called beam size method, and the hologram 3c of the hologram device 3 is constructed as a continuous area, and therefore, as compared with the optical pickup 1, the hologram device 3 is easily producible at a lower cost.

However, in this case, from the principle of the beam size method, there is a need to enlarge the diameter of a spot of the returning light on the optical detectors 8, 9 of the light-emitting/receiving device 7. For this reason, the distance between the light-receiving portions 8e, 8f or 9e, 9f for the detection of the tracking error signal and the central light-receiving section is prolonged, and hence, difficulty is experienced in considerably shortening the distances of the main beam and the side beams on the signal recorded surface of the optical disk D, and the tracking error signal tends to easily receive the influence from cuts or the like on the signal recorded surface of the optical disk D.

Moreover, due to the feature of this focus error detecting method, a false focusing signal takes place in an area in which the focus error is large as compared with the depth of focus of the objective lens, which requires a countermeasure against this false focusing signal.

SUMMARY OF THE INVENTION

Accordingly, the present invention has been developed in view of the above-mentioned problems, and it is an object of the present invention to provide an optical pickup and an optical disk unit based upon this optical pickup, which are capable of not only reducing their size but also of being constructed at a low cost, and even of ensuring an accurate servo.

For this purpose, in accordance with this invention, there is provided an optical pickup comprising a light source, an optical focusing means for focusing a light beam emitted from the light source on a signal recorded surface of an optical disk, an optical separating means placed between the light source and the optical focusing means and an optical detector including light-receiving sections for receiving a returning light beam from the signal recorded surface of the optical disk, which undergoes separation through the optical separating means, wherein the optical separating means is, in its light source side surface, equipped with a first diffraction grating and an optical path branching section composed of a plurality of surfaces having normal vectors different from each other and is, in its optical disk side surface, equipped with a second diffraction grating composed of a continuous area, and the first diffraction grating divides light from the light source into main and side beams while the second diffraction grating allows the light from the light source to pass and makes returning light from the optical disk diffracted toward the optical path branching section, and further, the optical path branching section divides the returning light from the optical disk to lead the divisions to the light-receiving sections of the optical detector.

With the above-mentioned construction, a light beam emitted from the light source is branched through the first diffraction grating of the optical separating means into three beams, that is, a main beam and side beams, which in turn, pass through the second diffraction grating such as a hologram and subsequently reach the signal recorded surface of the optical disk through the optical focusing means.

The returning light beam from the signal recorded surface of the optical disk again passes through the optical focusing means to be incident on the second diffraction grating of the optical separating means. Further, the returning light beam is diffracted by this second diffraction grating, and the returning light due to the main beam is incident on the optical path branching means such as Foucault's prism. Accordingly, the returning light occurring due to the main beam is branched by the respective surfaces of this optical path branching section, with the branched light being incident on the corresponding light-receiving sections of the optical detector, respectively. Thus, on the basis of the detection signals from the light-receiving sections, a reproduction signal is producible and a focus error signal is detectable according to the so-called Foucault method.

Furthermore, likewise, the side beam returning light is branched by the surfaces of the aforesaid optical path branching section to be incident on the corresponding light-receiving sections of the optical detector, so that the tracking error is detectable on the basis of the detection signals from the light-receiving sections according to, for example, the three beam method.

In this case, since the focus error signal is detected according to the Foucault method, the diameter of a spot of the returning light beam to be made on the optical detector is small. For this reason, the interval between the main beam and the side beam can be set to be short, thus enlarging the allowable range of the angle made between the signal string recorded on the optical disk and the line connecting the spots of the main beam and the side beam.

Still further, since the returning light is branched by the optical path branching section, the second diffraction grating can diffract the entire returning light together in the same direction. Accordingly, there is no need to divide the second diffraction grating into areas, and the second diffraction grating can be constructed as one continuous area, which contributes to the simplification of the construction of the entire optical separating means.

Moreover, since the optical path branching section is placed on the light source side surface of the optical separating means, the number of parts decreases, thereby achieving the size and thickness reduction of the whole optical pickup.

Besides, since the tracking error signal is detected according to the so-called three-beam method, even if there are defects on the signal recorded surface of the optical disk, the stable tracking servo becomes feasible.

Incidentally, in the case that the optical separating means is produced by the plastic injection molding or the glass press molding, the optical separating means is easily producible at a low cost.

In the case that the light source and the optical detector are formed on one semiconductor substrate and the optical separating means is supported with respect to this semiconductor substrate, the light source, the optical detector and the optical separating means are integrally constructed as one unit, which contributes to further size reduction of the optical pickup and the whole optical disk unit.

BRIEF DESCRIPTION OF THE DRAWINGS

The object and features of the present invention will become more readily apparent from the following detailed description of the preferred embodiment taken in conjunction with the accompanying drawings in which.

DETAILED DESCRIPTION OF THE INVENTION

Figure 1:
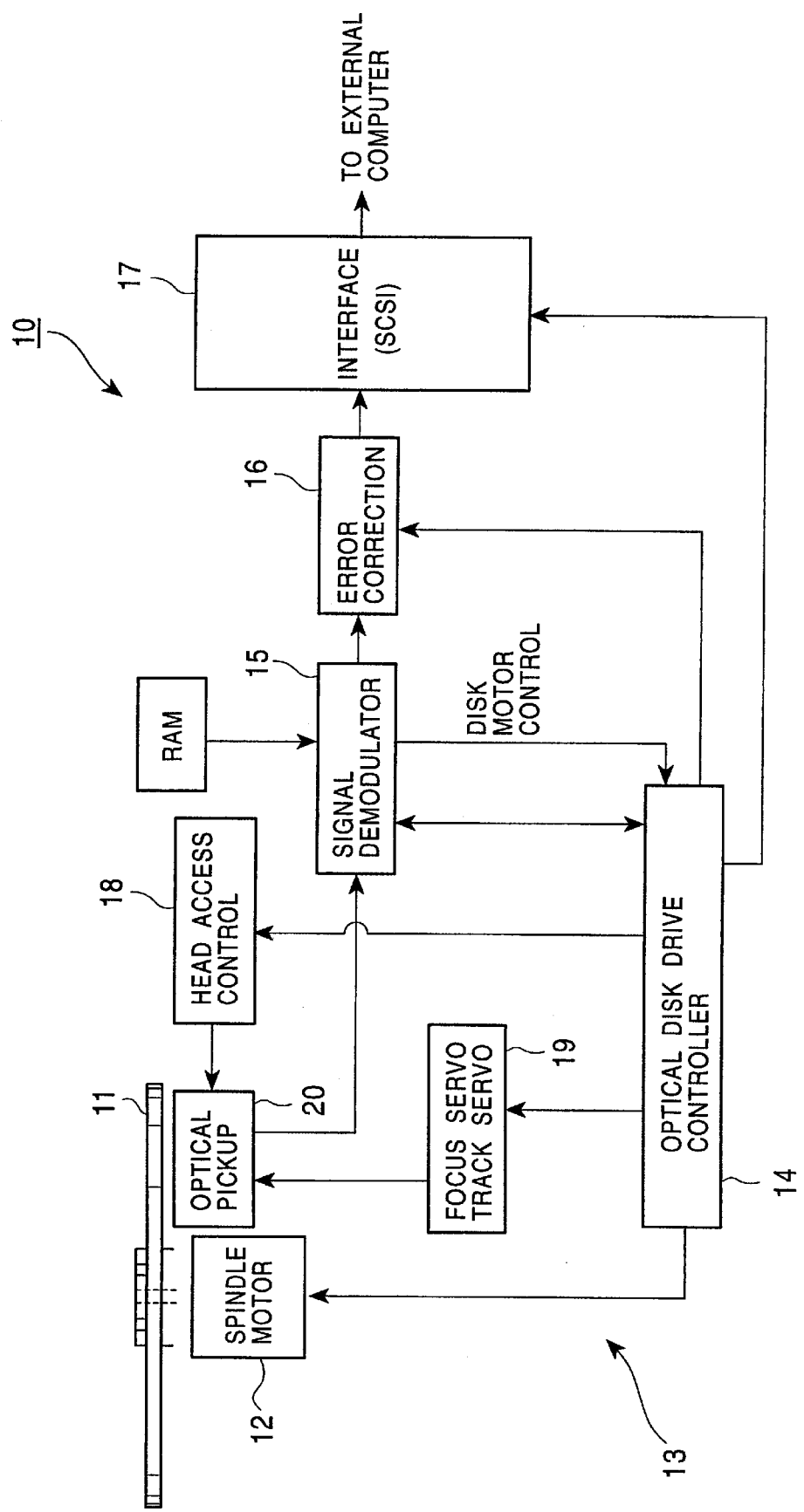
FIG. 1 is a block diagram showing the entire construction of an embodiment of an optical disk unit containing an optical pickup according to this invention.
Figure 2:
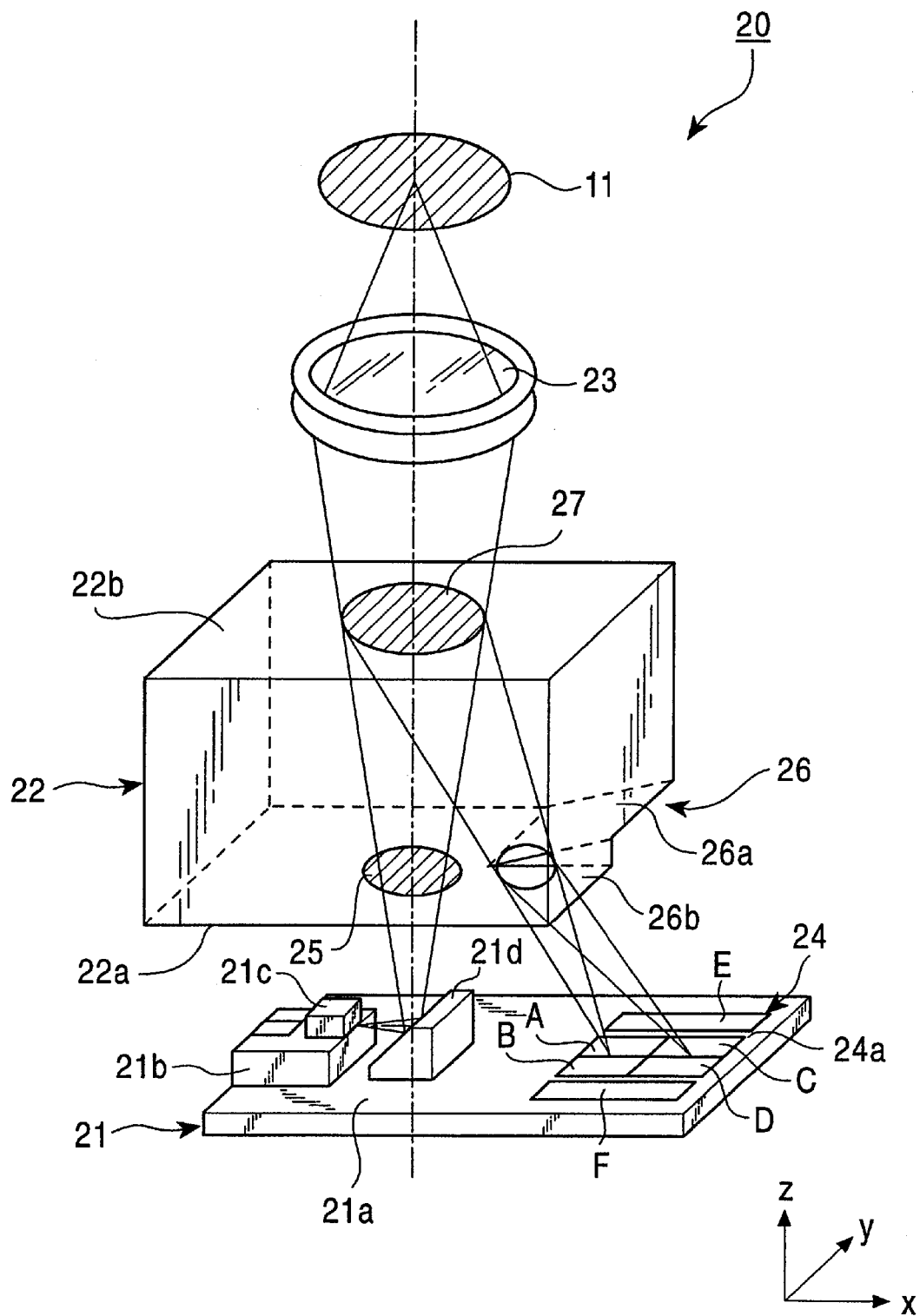
FIG. 2 is a perspective view schematically showing a construction of a first embodiment of the optical pickup in the FIG. 1 optical disk unit.
Figure 3:
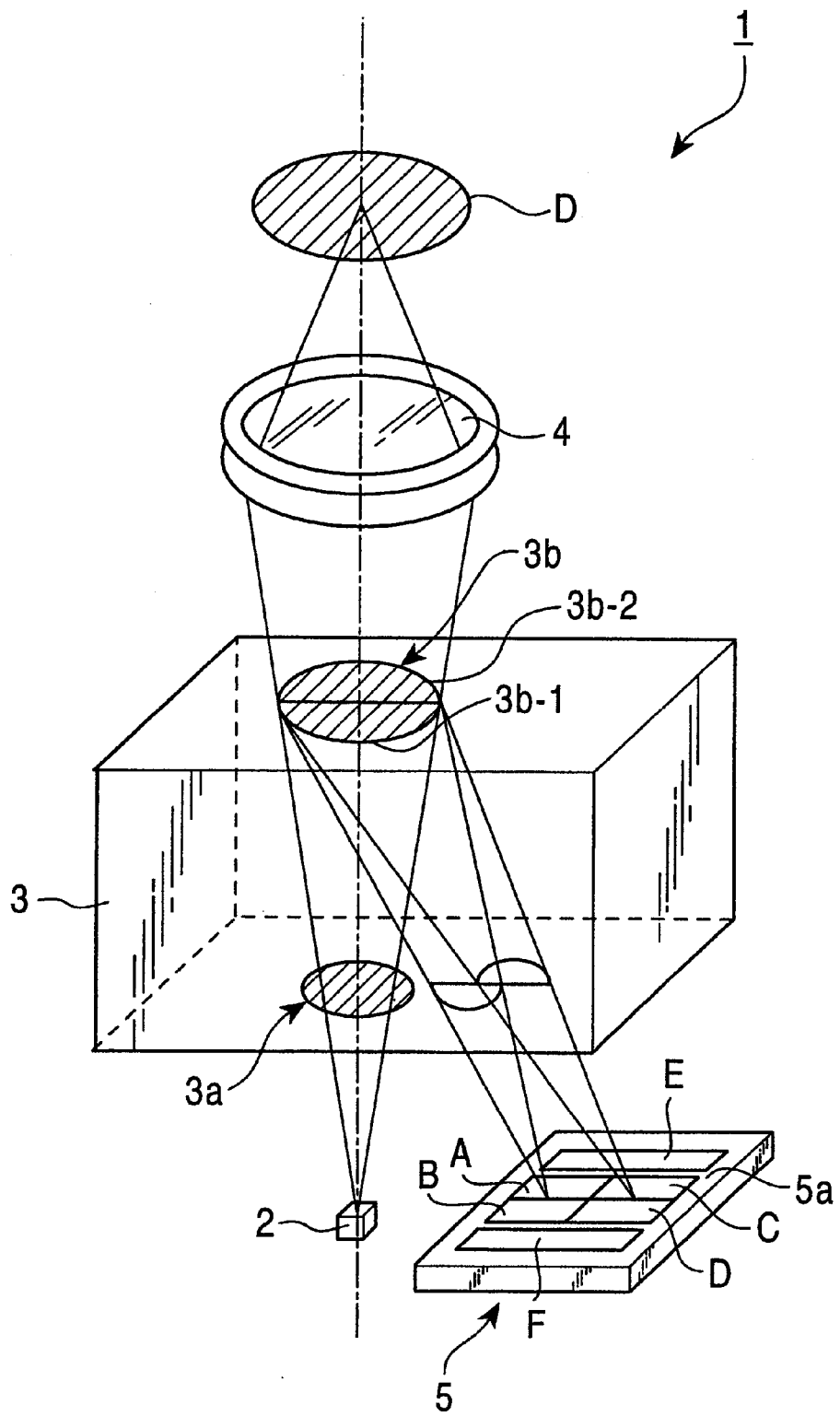
FIG. 3 is a perspective view schematically showing a construction of one example of a prior optical pickup.
Figure 4:
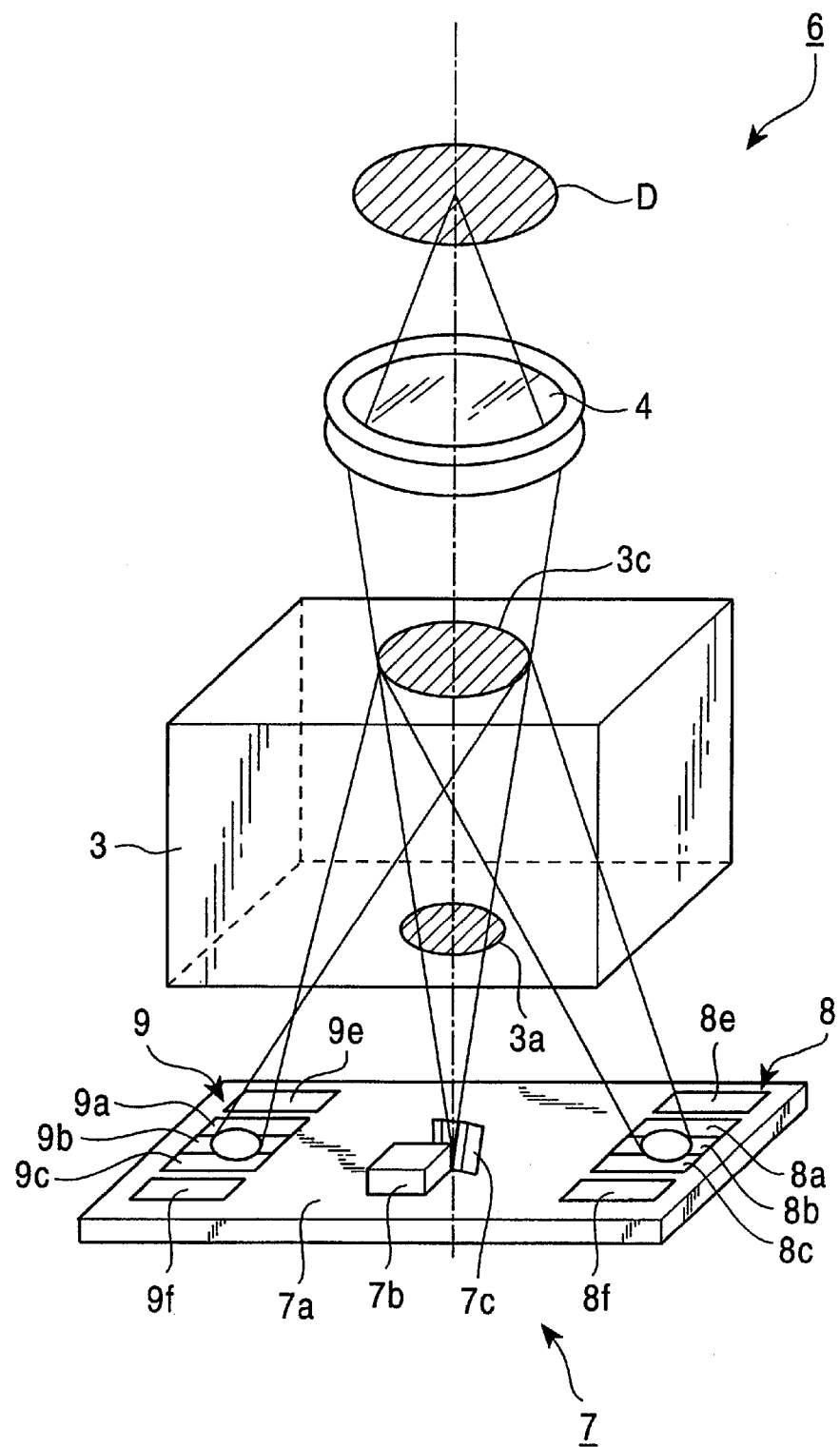
FIG. 4 is a perspective view schematically showing a construction of another example of the prior optical pickup.

Referring now to FIGS. 1 and 2, a description will be made hereinbelow in detail of a preferred embodiment of the present invention.

The embodiment which will be described hereinbelow is a concrete preferred example of this invention and includes various limitations desirable technically. However, the scope of this invention is not limited by the embodiment unless there is a description about the limitation of this invention in the following description.

FIG. 1 shows an example of an optical disk unit containing an optical pickup according to an embodiment of this invention.

In FIG. 1, an optical disk unit, generally denoted at numeral 10, comprises a spindle motor 12 serving as a drive means for rotationally driving an optical disk 11, an optical pickup 20 for recording a signal by irradiating a signal recorded surface of the optical disk 11 being in rotation with a light beam, and for reproducing the recorded signal through the use of the returning light beam from this signal recorded surface, and a control section 13 for controlling these components.

In this case, the control section 13 is composed of an optical disk controller 14, a signal demodulator 15, a RAM an error correction circuit 16, an interface 17, a head access control section 18 and a servo circuit 19.

The optical disk controller 14 is for controlling the spindle motor 12 so that it is driven to rotate at a predetermined speed. The signal demodulator 15 demodulates a recorded signal from the optical pickup 20 to correct its error and forwards it through the interface 17 to an external computer or the like. Whereupon, the external computer or the like can receive, as a reproduction signal, the signal recorded on the optical disk 11.

The head access control section 18 shifts the optical pickup 20 up to, for example, a given record track on the optical disk 11 by means of the track jump or the like. At this given shifted position, the servo circuit 19 shifts an objective lens, held by a biaxial actuator of the optical pickup 20, in the focusing direction and the tracking direction.

FIG. 2 illustrates the optical pickup incorporated into the above-described optical disk unit 10.

In FIG. 2, the optical pickup 20 includes a light-emitting section 21 serving as a light source, a hologram device 22 serving as an optical separating means, an objective lens 23 acting as an optical focusing means, and an optical detector 24.

The light-emitting section 21 is made up of a semiconductor laser device 21c placed on a second semiconductor substrate 21b situated on a first semiconductor substrate 21a, and a reflecting mirror 21d formed to be obliquely inclined, for example, at 45 degrees from a surface of the semiconductor substrate 21a.

In this instance, the semiconductor laser device 21c is a light-emitting device utilizing the recombination of a semiconductor, and operates as a light source to emit a light beam in an x direction. The light beam thus emitted from the semiconductor laser device 21c is reflected on the reflecting mirror 21d to advance in a z direction.

The hologram device 22 has two surfaces perpendicular to the optical axis of the light beam from the light-emitting section 21, where a first diffraction grating 25 is formed in a first surface 22a (lower surface in FIG. 2) existing on the light-emitting section 21 side and on the optical axis of the light beam from the light-emitting section 21 and a Foucault's prism 26 functioning as an optical branching section is formed in an area remote from the optical axis.

In addition, the hologram device 22 holds a hologram 27, serving as a second diffraction grating, in its second surface (upper surface in FIG. 2) existing on the optical disk 11 side and on the optical axis of the light beam from the light-emitting section 21.

The first diffraction grating 25 has parallel grooves extending in the x-axis direction to divide a light beam from the light-emitting section 21 into a main beam comprising 0 order diffracted light and two side beams comprising ±1 order diffracted light, respectively.

Incidentally, the first diffraction grating 25 is made to be as small in region area as possible in order to provide all the main beam and side beams.

The hologram 27, being the second diffraction grating, allows a light beam from the light-emitting section 21 to directly pass, and diffracts the returning light from the optical disk 11 to lead it to the optical detector 24.

In addition, the hologram 27 is composed of grooves appearing as a group of curves or a group of straight lines approximately parallel to the y axis in the entire diffraction area, and its spatial frequency takes a continuous condition. Whereupon, owing to the hologram 27, the returning light from the optical disk 11 is diffracted by a predetermined diffraction angle q in the x direction.

In this case, the diffraction angle q is set so that the returning light beam diffracted by the hologram 27 does not pass through the first diffraction grating 25.

Furthermore, the Foucault's prism 26 has two planes 26a, 26b with normal vectors different from each other, and the boundary between these planes 26a, 26b extends in parallel with the x axis, and is disposed to pass through the center of the returning light beam diffracted by the hologram 27.

In this case, the normal vector of the one plane 26a is designed to make an angle substantially equal to the diffracted angle q resulting from the aforesaid hologram 27 with respect to the normal vector of the other plane 26b. In addition, the normal vector of the other plane 26b has the same component as that of the normal vector of the light-emitting section 21 side surface 22a of the hologram device 22.

The objective lens 23 is a convex lens to focus the light from the light-emitting section 21 on a desired record track of the signal recorded surface of the optical disk D.

Besides, the objective lens 23 is supported by a non-shown biaxial actuator to be movable in two axial directions, that is, in the focusing direction and the tracking direction.

In the case illustrated, the optical detector 24 comprises a central light-receiving section 24a for receiving the main beam due to the division by the diffraction grating 25 and light-receiving portions E, F disposed both sides of this light-receiving section 24a to receive the side beams, and further, the light-receiving section 24a has four light-receiving portions A, B, C and D obtained by vertically and horizontally dividing the light-receiving section 24a into four.

Moreover, in a non-shown processing circuit, the detection signals from the respective light-receiving portions A, B, C, D, E and F are amplified by head amplifiers into output signals Sa, Sb, Sc, Sd, Se and Sf. In addition, in an arithmetic circuit, for instance, a reproduction signal RF is given according to the following equation (8).

$$RF=(Sa+Sb)+(Sc+Sd) \qquad (8)$$

Furthermore, a focus error signal FE is given by the so-called Foucault method according to the following equation (9), (10) or (10).

$$FE=(Sa+Sd)-(Sb+Sc) \qquad (9)$$

$$FE=(Sa-Sb) \qquad (10)$$

$$FE=(Sd-Sc) \qquad (11)$$

Still further, a tracking error signal TE is given by the so-called three beam method according to the following equation (12).

$$TE=(Se-Sf) \qquad (12)$$

Although, as shown in FIG. 2, the foregoing optical detector 24 is constructed integrally with the light-emitting section 21 in a manner of being formed on the semiconductor substrate 21a of the light-emitting section 21, this invention is not limited this construction, but the optical detector 24 can also be constructed as a part separate from the light-emitting section 21.

The optical disk unit 10 containing the optical pickup 20 according to this embodiment is made as described above, and its operation is as follows.

First of all, the rotation of the spindle motor 12 of the optical disk unit 10 rotationally drives the optical disk 11, and the optical pickup 20 is shifted along a non-shown guide in a radial direction of the optical disk 11 so that the optical axis of the objective lens 23 is shifted up to a desired track position on the optical disk 11, thereby accomplishing the access thereto.

In this state, in the optical pickup 20, a light beam from the light-emitting section 21 is divided through the first diffraction grating 25 of the hologram device 22 into three light beams which in turn, pass through the hologram 27 to be focused on the signal recorded surface of the optical disk 11 by means of the objective lens 23.

The returning light from the optical disk 11 again passes through the objective lens 23 to be incident on the hologram 27 of the hologram device 22. Further, the returning light is diffracted by the hologram 27 so that the returning light due to the main beam is incident on the Foucault's prism 26. Thus, the main beam returning light is divided by the planes 26a, 26b of the Foucault's prism 26 in semicircular configurations, so that the division light is incident on the light-receiving portions of the optical detector 24, respectively. That is, the returning light passing through the plane 26a comes in the light-receiving portions A and B, while the light passing through the plane 26b reaches the light-receiving portions C and D. In addition, the side beam returning light is divided by the Foucault's prism 26 in substantially semicircular configurations and the division light strike on the light-receiving portions E and F.

Accordingly, on the basis of the detection signals from the respective light-receiving portions of the optical detector 24, the recorded signal on the optical disk 11 is reproducible, and as mentioned above, the tracking error signal TE is detectable according to the three beam method and the focusing error signal is detectable according to the Foucault method, and further, on the basis of these signals, the servo circuit 19 performs the focus servo and tracking servo of the optical pickup 13 through the use of the optical disk drive controller 14.

In this case, since the hologram 27 serving as the optical disk side second diffraction grating is wholly constructed as one continuous area, it can easily be formed by the plastic injection molding, the glass press molding or the like and the formation metal pattern is easily producible, which allow low-cost manufacturing.

Although, in the above-described embodiment, the hologram device 22 with the hologram 27 is used, this invention is not limited to this, and obviously, any construction is also acceptable if using an optical separating means in which a diffraction grating is provided on an optical disk 11 side surface to separate the returning light.

Furthermore, although in the above-described embodiment, the aforesaid hologram device 22 is constructed in the separated condition from the light-emitting section 21 and the optical detector 24, it is also appropriate that the hologram device 22 is integrally supported with respect to the semiconductor substrate 21a of the light-emitting section 21. In this case, the light-emitting section 21, the optical detector 24 and the hologram device (or the optical separating means) are integrally constructed as one unit.

Still further, although the optical disk unit 10 or the optical pickup 20 according to the above-described embodiment employs a non-polarization optical pickup construction for the reproduction from an optical disk such as a compact disk (CD) and a CD-ROM, this invention is not limited to this, but is also applicable to a polarization optical pickup or an optical disk unit based thereon for a magneto optical disk (MO) or the like.

As described above, according to this invention, it is possible to provide an optical pickup or an optical disk unit using this optical pickup, capable of offering a small-sized construction at a low cost, and further, of enabling an accurate servo.

It should be understood that the foregoing relates to only a preferred embodiment of the present invention, and that it is intended to cover all changes and modifications of the embodiment of the invention herein used for the purpose of the disclosure, which do not constitute departures from the spirit and scope of the invention.

What is claimed is:

1. An optical pickup comprising:
    a light source;
    optical focusing means for focusing a light beam emitted from said light source on a signal recorded surface of an optical disk;
    optical separating means placed between said light source and said optical focusing means; and
    an optical detector including light-receiving sections for receiving a returning light beam from said signal recorded surface of said optical disk, which undergoes separation through said optical separating means,
    wherein said optical separating means is, in its light source side surface, equipped with a first diffraction grating and an optical path branching section composed of a plurality of surfaces having normal vectors different from each other and is, in its optical disk side surface, equipped with a second diffraction grating composed of a continuous area,
    said first diffraction grating dividing light from said light source into main and side beams, while said second diffraction grating allows said light from said light source to pass and diffracts returning light from said optical disk toward said optical path branching section, and
    said optical path branching section divides said returning light from said optical disk to lead the divisions to said light-receiving sections of said optical detector.

2. An optical pickup as defined in claim 1, wherein said optical path branching section is a Foucault's prism.

3. An optical pickup as defined in claim 1, wherein said second diffraction grating is a hologram.

4. An optical pickup as defined in claim 1, wherein said optical separating means is formed through injection molding of a plastic.

5. An optical pickup as defined in claim 1, wherein said optical separating means is formed by glass press molding.

6. An optical pickup as defined in claim 1, wherein said light source and said optical detector are formed on one semiconductor substrate, and said optical separating means is supported on said semiconductor substrate.

7. An optical pickup as defined in claim 1, wherein said light-receiving sections of said optical detector receive light beams produced by the division occurring through said optical branching section, and said optical detector outputs detection signals to be used for generating a reproduction signal, a focus error signal and a tracking error signal.

8. An optical disk unit comprising:
    drive means for rotationally driving an optical disk;
    an optical pickup for applying light through optical focusing means to said optical disk which rotates, and for detecting returning light from a signal recorded surface of said optical disk through said optical focusing means;
    a biaxial actuator for supporting said optical focusing means so that said optical focusing means is movable in two axial directions;
    a signal processing circuit for producing a reproduction signal on the basis of a detection signal from said optical pickup; and
    a servo circuit for moving said light focusing means in said two axial directions on the basis of said detection signal from said optical pickup,
    said optical pickup including:
        a light source;
        optical focusing means for focusing a light beam emitted from said light source on a signal recorded surface of an optical disk which is rotationally driven;
        optical separating means placed between said light source and said optical focusing means; and
        an optical detector including light-receiving sections for receiving a returning light beam from said signal recorded surface of said optical disk, which undergoes separation through said optical separating means,
        wherein said optical separating means is, in its light source side surface, equipped with a first diffraction grating and an optical path branching section composed of a plurality of surfaces having normal vectors different from each other and is, in its optical disk side surface, equipped with a second diffraction grating composed of a continuous area,
        said first diffraction grating dividing light from said light source into main and side beams, while said second diffraction grating allows said light from said light source to pass and diffracts returning light from said optical disk toward said optical path branching section, and
        said optical path branching section divides said returning light from said optical disk to lead the divisions to said light-receiving sections of said optical detector.

9. An optical disk unit as defined in claim 8, wherein said optical path branching section is a Foucault's prism.

10. An optical disk unit as defined in claim 8, wherein said second diffraction grating is a hologram.

11. An optical disk unit as defined in claim 8, wherein said optical separating means is formed through injection molding of a plastic.

12. An optical disk unit as defined in claim 8, wherein said optical separating means is formed by glass press molding.

13. An optical disk unit as defined in claim 8, wherein said light source and said optical detector are formed on one semiconductor substrate, and said optical separating means is supported on said semiconductor substrate.

14. An optical disk unit as defined in claim 8, wherein said light-receiving sections of said optical detector receive light beams produced by the division occurring through said optical branching section, and said optical detector outputs detection signals to be used for generating a reproduction signal, a focus error signal and a tracking error signal.

* * * * *